July 19, 1960  W. STELZER  2,945,726
TRACTOR-TRAILER BRAKE SYSTEM
Filed May 4, 1956  2 Sheets-Sheet 1
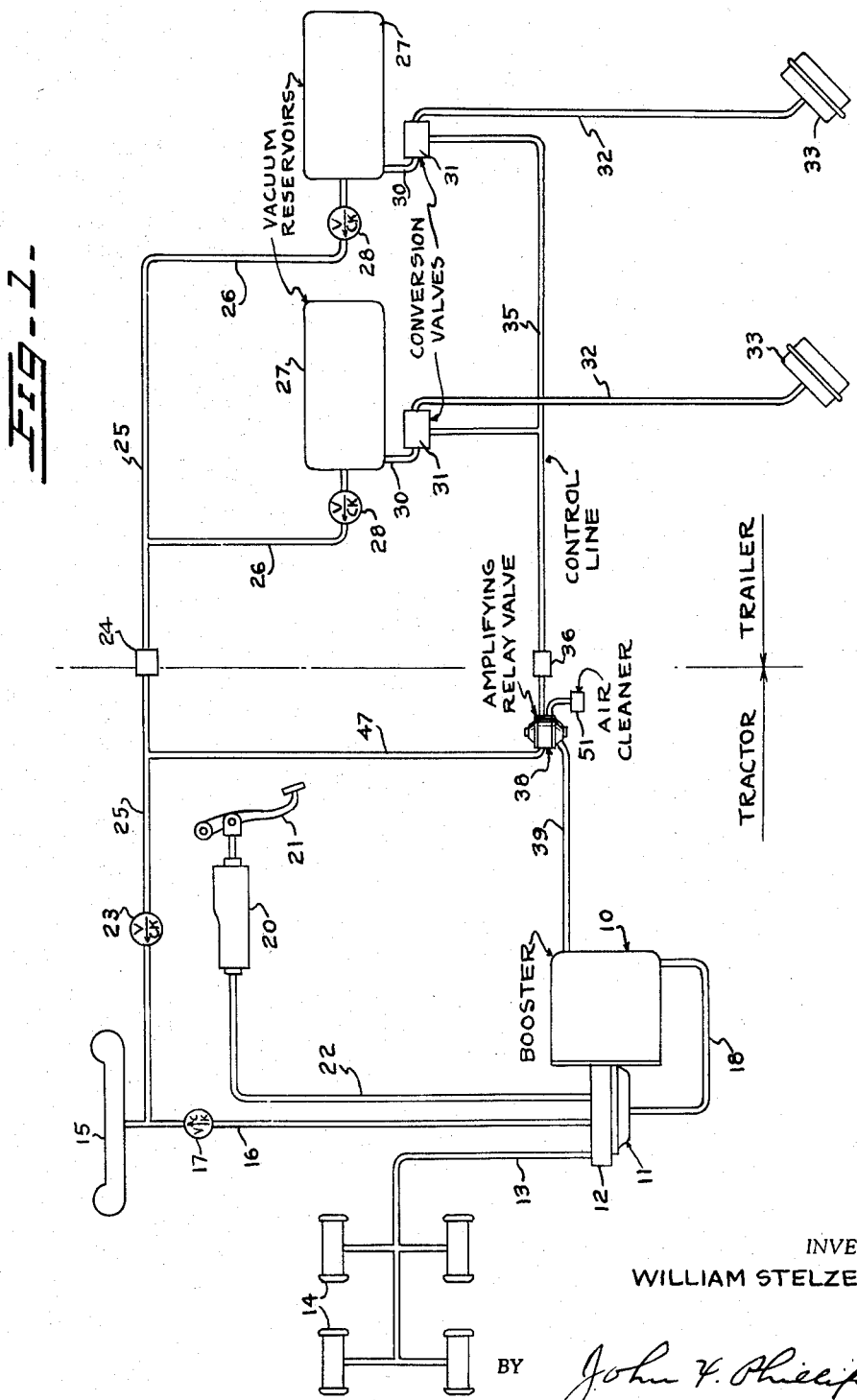
INVENTOR
WILLIAM STELZER
BY John F. Phillips
ATTORNEY

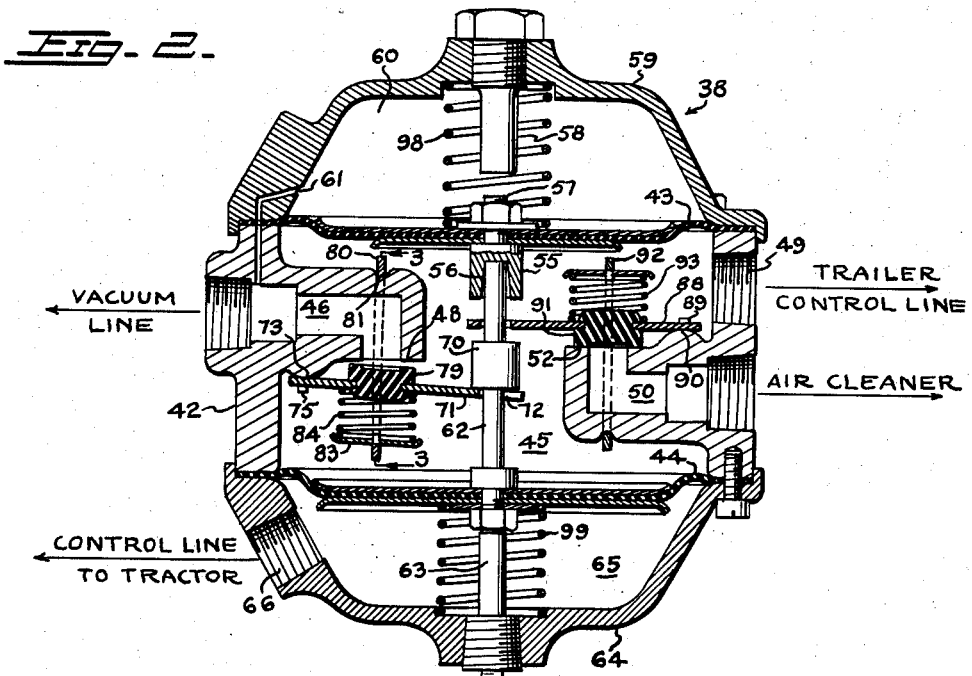

United States Patent Office 2,945,726
Patented July 19, 1960

2,945,726

TRACTOR-TRAILER BRAKE SYSTEM

William Stelzer, Summit, N.J., assignor to Kelsey-Hayes Company, a corporation of Delaware Filed May 4, 1956, Ser. No. 582,838

14 Claims. (Cl. 303—31)

This invention relates to a tractor-trailer brake system, and more particularly to an amplifying relay valve for increasing the application of the trailer brakes relative to application of the tractor brakes during initial or light tractor brake application.

Conventional tractor-trailer brake systems employ a pedal controlled booster motor on the tractor for supplying hydraulic fluid to the wheel cylinders of the tractor. The trailer is provided conventionally with a vacuum reservoir having a conversion valve between the reservoir and the brake applying motors of the trailer. The conversion valve is connected to a vacuum reservoir and to a control line leading to the tractor booster motor so that pressure changes in the control line, occurring incident to operation of the booster motor, will operate the conversion valve to disconnect the trailer brake motors from the atmosphere and connect them to the reservoir for the application of the trailer brakes whenever the tractor brakes are applied.

Conversion valves of the type referred to require substantial pressure changes in the control line to generate the pressure necessary to operate the conversion valve due to the large valve parts used in the conversion valve to afford substantial communication between the vacuum reservoir and the trailer brake motors. As a result, weak signals in the control line will fail to generate in the conversion valve force necessary to operate the latter valve. Under such conditions, therefore, a light application of the tractor brakes will effect no brake application whatever on the trailer.

An important object of the present invention is to provide a system of the type referred to having means for subjecting the conversion valve to signals amplified relative to control line signals in initial tractor brake operation, whereby initial trailer brake application will take place to a proportionately greater extent under such conditions than is true in conventional systems.

A further object is to provide a tractor-trailer brake system wherein an amplifying relay valve is connected in the system and is subject to control by tractor booster motor pressures upon operation of the brake pedal, to convert relatively weak control line signals into stronger signals at the conversion valve, thus resulting in the amplifying of trailer brake actuation relative to tractor brake operation in the initial stages of brake pedal operation.

A further object is to provide a novel type of amplifying relay valve adapted to be connected in a tractor-trailer brake system and which is so constructed as to be operated by slight changes in pressure in the control line from the tractor booster brake to provide substantially increased changes in pressures affecting the conversion valve whereby, in light tractor brake operations, the resistance to operation of the conversion valve is overcome by greater changes in control pressures therein.

Other objects and advantages of the invention will become apparent during the course of the following description.

In the drawings I have shown two embodiments of the invention. In this showing:

Figure 1 is a diagrammatic view of a tractor-trailer brake system showing the amplifying relay valve therein;

Figure 2 is an enlarged axial sectional view through one type of amplifying relay valve;

Figure 3 is a detail sectional view on line 3—3 of Figure 2;

Figure 4 is a detail perspective view of one of the rocker plates shown in Figure 2; and Figure 5 is a detail axial sectional view through a modified type of amplifying relay valve.

Referring to Figure 1, the numeral 10 designates a booster motor mounted on the tractor and preferably of the vacuum-suspended type, for example, as shown in the copending application of Jeannot G. Ingres, Serial No. 455,647, filed September 13, 1954, now Patent No. 2,905,151, granted September 22, 1959. The booster motor is provided with a valve mechanism diagrammatically indicated as a whole by the numeral 11 and is further provided with a hydraulic chamber device 12 from which fluid is displaced upon operation of the motor 10 through lines 13 to the wheel cylinders 14 of the tractor.

Vacuum for operating the motor 10 is supplied through any suitable source, which may be either the intake manifold of the tractor engine, indicated by the numeral 15, or other conventional means such as a vacuum pump. A line 16, having the usual check valve 17 therein, is connected between the source 15 and the valve mechanism 11, and the valve mechanism directly connects the adjacent end of the motor 10 with the line 16. Normally, vacuum is also communicated to the remote end of the motor 10 through a jumper line 18. Upon operation of the valve mechanism in a manner to be described, the line 18 is disconnected from the vacuum line 16 and connected to the atmosphere, whereupon the motor 10 operates to displace hydraulic fluid into the wheel cylinders 14.

A conventional master cylinder 20 has the usual piston (not shown) therein operable by a brake pedal 21 to displace hydraulic fluid through a line 22 to the valve mechanism for the booster to operate the latter. The booster motor preferably is of the type in which fluid displaced through line 22 not only operates the valve mechanism for the booster 10 but also assists the latter in displacing fluid through the line 13, as shown in the copending application referred to.

Also connected to the source 15 is a vacuum supply line 25 having a check valve 23 therein. This line continues rearwardly to the trailer as shown and is provided with the usual connector 24 of any approved type. The supply line is shown in the present instance as having branches 26 leading respectively to conventional vacuum reservoirs 27, the branches 26 having check valves 28 therein in accordance with conventional practice. Attention is invited to the fact that conventional tractor-trailer brake systems of this general type are provided with a single vacuum reservoir operating as a source to provide vacuum for operating the trailer brakes. However, separate vacuum reservoirs and separate brake mechanisms for the two axles of the trailer may be employed, as shown.

Each of the reservoirs is connected by a line 30 to a conventional conversion valve 31 having a line 32 leading to the brake-applying motors 33 of the associated trailer axle. These conversion valves are subject to operation in accordance with booster motor energization by changes in pressure in a control line 35 extending forwardly to the tractor and provided with the usual connector 36 therein.

The device forming the principal subject matter of the present invention comprises an amplifying relay valve indicated as a whole by the numeral 38 and described in detail below. This relay valve is interposed between the control line 35 and a control line 39 leading to the variable pressure end of the booster motor 10, the line 39 corresponding to the conventional control line which ordinarily extends directly to the trailer brake conversion valve.

Referring to Figure 2, the numeral 42 designates the preferably die-cast body of the relay valve 38, and the top and bottom of body 42 are closed respectively by pressure responsive diaphragms 43 and 44 forming with the body 42 a control chamber 45.

The body 42 is provided with a duct 46 the outer end of which is connected to a vacuum line 47 (Figure 1) tapped into the vacuum supply line 25. The inner end of the duct 46 turns downwardly and terminates in a valve seat 48 for a purpose described below. The body 42 is further provided with a port 49 connected to the control line 35 (Figure 1). The body 42 is also provided with an air duct 50 leading to the atmosphere preferably through an air cleaner 51 (Figure 1). The inner end of the duct 50 turns upwardly to terminate in a valve seat 52 further described below.

The diaphragm 43 carries a stud 55 therebeneath having an internal preferably tapered recess 56. The stud 55 forms the lower head of a bolt 57 by which the stud is fixed to the diaphragm 43. The upper end of the bolt 57 is engageable with a depending stop member 58 carried by a cap 59 secured to the top of the diaphragm 43 and forming therewith a chamber 60 communicating with the duct 46 through a restricted passage 61.

Arranged axially within the chamber 45 is a stem 62 the upper end of which is normally seated in the recess 56. The lower end of the stem 62 acts as an attaching bolt for securing such stem to the diaphragm 44, as will be apparent. Downward movement of the diaphragm 44 is limited by engagement of the lower end of the stem 62 with a stop member 63 carried by a lower cap 64 secured to the body 42 and seating against the periphery of the diaphragm 44. The cap member 64 forms with the diaphragm 44 a chamber 65 communicating through a port 66 with the booster motor control line 39 (Figure 1).

The stem 62 is provided in the chamber 45 with an actuating shoulder member 70 the lower end of which is engageable with a rocker 71 having an opening 72, preferably in the form of a slot for assembly purposes, through which the stem 62 projects. The other end of the rocker 71 is adapted to rock on a shoulder 73 formed integral with the body 42 as shown in Figure 2. The rocker 71 is flat, as shown in Figure 4, and is provided preferably with a pair of openings 74 receiving positioning studs 75 projecting downwardly from the bearing shoulder 73. Two of the studs 75 are preferably employed to properly guide the rocker 71.

The rocker 71 is further provided intermediate its ends with a relatively large opening 78 receiving a resilient valve 79 engageable with the valve seat 48. Straddling and surrounding the rocker 71 and duct 46 is a closed yoke 80 the top portion of which is engageable in a recess 81 to maintain it in proper position with respect to the parts with which it is associated. The bottom of the yoke 80 is provided with an upstanding stud 82 projecting through a spring seat 83, and a spring 84 is interposed between this seat and the bottom surface of the rocker 71. Obviously the spring 84 urges the valve 79 to closed position. This valve is normally held open by the shoulder member 70, as shown in Figure 2.

The valve device for the valve seat 48 is duplicated with respect to the valve seat 52 and need not be referred to in detail. A rocker 88, similar to the rocker 71, is positioned by studs 89 and rocks on a shoulder 90. This rocker carries an air valve 91, similar to the valve 79, and normally engaging the seat 52 from which it is movable upon upward movement of the shoulder member 70 into engagement with the adjacent end of the rocker 88. A yoke 92, which may be identical with the yoke 80, has associated therewith a spring 93 for urging the valve 91 toward its seat 52.

It is important in the proper operation of the amplifying relay valve 38 to effect closing movement of the valve 79 and opening movement of the valve 91 with a minimum degree of force. In the form of the invention shown in Figure 2, a coil spring 98 is arranged in the chamber 60 and engages at opposite ends against the cap 59 and diaphragm 43. A similar spring 99 is arranged in the chamber 65 between the diaphram 44 and cap 64. The springs 98 and 99 nearly cancel out each other, the spring 98 being only sufficiently stronger than the spring 99 to insure the opening of the vacuum valve 79 when the parts return to the normal position shown in Figure 2. The spring 84 may be relatively weak, but it is necessary that the spring 93 may be made slightly stronger to insure maintaining the valve 91 on the seat 52 against atmospheric pressure in the duct 50 when vacuum is present in the chamber 45.

A modified form of the invention is shown in Figure 5. In such form of the invention the amplifying relay valve is indicated as a whole by the numeral 100 and comprises a valve body 101 closed respectively at the top and bottom by diaphragms 102 and 103. The diaphragm 102 is maintained in position by a cap 104 seated on the diaphragm 102 and secured in any suitable manner to the body 101. The cap 104 forms with the diaphragm 102 a vacuum chamber 105 corresponding to the chamber 60 referred to above. The chamber 105 communicates through a restricted passage 106 with a duct 107 the outer end of which is connected to the vacuum line 47 (Figure 1). The inner end of the duct 107 turns downwardly and terminates in a valve seat 108 further described below.

A cap 110 is seated against the bottom of the diaphragm 103 and forms therewith a chamber 111 communicating with a port 112 connected to the booster motor control line 39.

A bolt 115 is fixed to the diaphragm 102 and has its lower head formed as an apertured stud 116. A similar bolt 117 is secured to the diaphragm 103 and has its upper head formed as a stud 118. Upward movement of the diaphragm 102 is limited by engagement of the bolt 115 with the cap 104, and downward movement of the diaphragm 103 is limited by engagement of the bolt 117 with the cap 110. The studs 116 and 118 are connected to the ends of a tension coil spring 119 the coils of which normally contact with each other and are under tension when in such normal positions. As will become apparent below, the spring 119 and diaphragms 102 and 103 move vertically substantially as a unit during initial operation of the valve device 100.

A spring seat 121 is arranged axially beneath the seat 108 and is urged downwardly by a spring 122. The seat 121 carries therein a resilient valve 123 engageable with, but normally disengaged from, the seat 108.

The body 101 is provided with a port 126 communicating with the control line 35 (Figure 1). The body 101 is further provided with a port 127 connected to the atmosphere preferably through an air cleaner such as is indicated by the numeral 51 in Figure 1. The port 127 communicates with a chamber 128. At the lower end of this chamber is arranged a valve seat 128' controlling communication between the chamber 128 and a chamber 129 formed within the body 101 between the diaphragms 102 and 103. The seat 128' is normally closed by a resilient valve 130 carried by a stem 131 the lower end of which engages the diaphragm 103. The stem is urged downwardly by a spring 132 the upper end of which engages a cap 134 which closes the upper end of the chamber 128 and acts as a guide for the upper end of the stem 131.

Operation

When it is desired to apply the brakes of the tractor-trailer combination, the pedal 21 is depressed to displace fluid from the master cylinder 20 through the line 22 to operate the booster motor 10. This motor operates to displace fluid through lines 13 to the tractor wheel cylinders 14, preferably assisted by foot-generated pressure in the line 22. The operation of the valve mechanism 11 by fluid displaced through line 22 disconnects the jumper line 18 from the source of vacuum and connects it to the atmosphere, thus admitting air into the back end of the normally vacuum suspended motor 10. It is this admission of air into the back end of the motor which effects energization of the motor to operate the wheel cylinders 14. With conventional systems, the admission of air into the motor 10 through the line 18 admits air directly through a line corresponding to the line 39 into a conversion valve which connects a vacuum reservoir to the trailer brake motors. With such conventional systems, as previously pointed out, a light application of the tractor brakes, or the initial operation of such brakes will not cause a sufficient rise in pressure in the line 35 to operate the conversion valve which requires substantial control line pressure for its operation. This defect is overcome with the present mechanism.

Referring to Figure 2, it will be seen that when the booster motor 10 is de-energized, vacuum will be present in the chamber 65 and since the valve 79 is normally open, vacuum will be present in the chamber 45. Since the chamber 60 communicates at all times with the vacuum duct 46, vacuum will be present in the chamber 60. All three chambers of the amplifying relay valve thus will be subject to vacuum.

When the brake pedal is operated to apply the tractor brakes, the resultant increase in pressure in the control line 39, which may be termed the primary control line, will effect an increase in pressure in the chamber 65 (Figure 2) thus unbalancing pressures on opposite sides of the diaphragm 44. Whereas the spring 98 normally slightly overbalances the spring 99, increased pressure in the chamber 65 will effect upward movement of the diaphragm 44 and stem 62. The shoulder member 70 thus will be released from the rocker 71 and the spring 84 will close the vacuum valve 79. The valves 79 and 91 are now in lap position. Further upward movement of the diaphragm 44 will engage the shoulder member 70 with the rocker 88 to swing the latter upwardly and unseat the valve 91 to admit air into the chamber 45, this admission of air taking place at a rate depending upon the opening movement of the valve 91 which, in turn, will be determined by the increase in pressure in the chamber 65. Air admitted into the chamber 45 will flow through port 49 into the trailer control line 35, which may be termed the secondary control line, to operate the conversion valves 31, thus connecting the trailer brake motors 33 to their reservoirs to apply the trailer brakes.

The magnitude of the signal thus transmitted to the conversion valves through line 35 depends upon the relative strengths of the springs 98 and 99 which are proportioned to give the desired effect of providing higher pressures in the line 35 than in the line 39 during initial brake operation. Therefore, opening movement of the valve 91 will result in higher pressures in the chamber 45 than in the chamber 65. During initial stages of brake operation, the pressure in the chamber 45 acts to an equal extent upwardly against the diaphragm 43 and downwardly against the diaphragm 44, this pressure being less than the force exerted by the spring 98. Accordingly, there will be no downward reaction on the diaphragm 44.

Therefore it will be apparent that during initial brake operation when weak impulses are present in the primary control line 39, an amplified impulse will be supplied through the secondary control line 35 to operate the conversion valves. Because of the sensitiveness of the present device under such conditions, therefore, an application of the trailer brakes will occur to an appreciable extent whereas with prior systems, with weak impulses present in the control line, no trailer brake application would occur. The operation of the device thus tends to prevent any jackknifing of the trailer relative to the tractor. The passage 61 is preferably restricted so that the diaphragms have less tendency to flutter at the beginning of a brake operation when air is admitted to the chamber 45. As previously stated, there will be no reaction built up against the signal in the primary control line 39 during initial brake operation. As pressure increases in the chamber 45, however, and pressure of the air admitted to the chamber 45 increases to a predetermined point, the diaphragm 43 will be moved upwardly to its limit of movement with the bolt 57 engaging the stop 58. From this point on, the spring 98 is inoperative. However, the diaphragm 44 under such conditions does not attempt to follow the diaphragm 43 in its upward movement due to the increased pressure in the chamber 45. From the point at which the socket 56 moves out of engagement with the upper end of the stem 62, therefore, reaction will occur against the diaphragm 44. This reaction tends to urge the diaphragm 44 downwardly, and accordingly tends to urge the air valve 91 and vacuum valve 79 back to their normal positions. Any tendency for too great an increase in pressure to occur in the chamber 45 will result in downward movement of the diaphragm 44 to close the air valve 91 to prevent the admission of additional air into the chamber 45, and if necessary, the valve 79 will be cracked.

In view of the foregoing, it will be apparent that the diaphragm 44 and chamber 65 constitute an expansible motor mechanism responsive to pressure impulses in the primary control line 39 to actuate the valve means in the chamber 45 to admit air into the secondary control line 35. After the air pressure in the chamber 45 takes over control of the diaphragm 44, and hence controls the positions of the valves 79 and 91, there will be a proportionate increase in the pressure in the secondary control line 35 relative to the increase in pressure in the chamber 65. After the initial stage of brake operation described, the pressure in the secondary control line 35 will remain approximately proportionate to the pressure in the primary control line 39 plus the pressure generated by spring 99, throughout the remainder of the brake operation.

When the brakes are released, the motor 10 again becomes vacuum-suspended through the line 18, and air will be exhausted from the chamber 65. The stem 62 will then move downwardly to permit the closing of the air valve 91 and to effect the opening of the vacuum valve 79, whereupon vacuum conditions will be re-established in the chamber 45. Thus all of the parts return to normal positions, and normal conditions with respect to pressures in the various chambers of the valve 38 will be re-established.

In the device shown in Figure 5, the single tension spring 119 ordinarily has its coils seated and under tension, and the spring thus serves as a resilient connecting link between the diaphragms 102 and 103. There are no springs similar to the springs 98 and 99 to provide a net downward force acting on the diaphragms. It will be noted, however, that both valve operating springs 122 and 132 provide this net downward force tending to hold the parts in normal positions. The spring 132 is stronger than the spring 122 and since the diaphragm 103 is flexible, it will be apparent that a rise in pressure in the bottom chamber 111, incident to energization of the booster motor 10, will result in the exertion of an upward force against the diaphragm which will first move the valve 123 to closed position and then open the valve 130. Thus the chamber 129 will be cut off from the vacuum passage 107 and connected to the atmospheric passage 127 and air will be admitted into the chamber 129, hence through port 126 to the trailer control line 35 to operate the conversion valves.

As is true of the form of the invention shown in Figure 2, the diaphragms 102 and 103 will move upwardly as a unit during initial brake operation when weak impulses are present in the chamber 111. For the reason referred to above, there will be no downward reaction on the diaphragm 103 tending to restore the valves 123 and 130 to their normal positions, hence an impulse in the secondary control line is stronger than the impulse in the primary control line. As the pressure in the chamber 111 increases to open the air valve 130 and increase the pressure in the chamber 129, a point will be reached where the pressure in the chamber 129 will move the diaphragm 102 upwardly to its limit of movement and the low rate of the spring 119 renders pressure in the chamber 129 effective for reacting against the diaphragm 103 to urge the valves 123 and 130 to return to normal positions to reduce pressure in the chamber 129. Of course, after the spring 119 yields, it still keeps aiding the pressure in the chamber 111 to exert upward force on the diaphragm 103, although this helping force remains constant after the spring 119 has yielded. After the initial brake application, therefore, the device shown in Figure 5 functions substantially in the same manner as the form of the invention shown in Figure 2.

When the brakes are released, the operation referred to above is reversed. Air will be evacuated from chamber 111, whereupon the springs 122 and 132 will urge the diaphragm 103 downwardly. The spring 132 being stronger than the spring 122, the air valve 130 will first close, followed by the opening of the valve 123. All normal conditions then will be re-established.

From the foregoing, it will be apparent that the present invention renders the controlling of the trailer brakes highly sensitive and provides for the application of the trailer brakes to a greater proportionate extent than the tractor brakes during initial or light tractor brake application. A heavier tractor brake operation results in proportionate application of the trailer brakes.

It is to be understood that the forms of the invention shown and described are to be taken as preferred examples of the same and that various changes in the shape, size and arrangement of the parts may be made as do not depart from the spirit of the invention or the scope of the appended claims.

I claim:

1. In a remote control vacuum operated brake system having a control line to transmit pressure impulses from a source of pressure to control remote brakes, and remote means normally subject to vacuum and responsive to said pressure impulses in said control line to control a vacuum source to cause the application of said brakes, in combination, an amplifying relay valve interposed in said control line and dividing said control line into a primary control line normally subject to a vacuum and adapted to receive pressure impulses from said source and a secondary control line normally subject to a vacuum and connected to said remote means, said amplifying relay valve comprising a chamber connected to said secondary control line, a normally open vacuum valve and a normally closed air valve controlling communication of said chamber respectively with a source of vacuum and the atmosphere, an expansible chamber motor mechanism including a normally vacuum suspended pressure responsive portion responsive to a control pressure impulse in said primary control line to close said vacuum valve and open said air valve to admit air into said chamber and into said secondary line to operate said remote means to apply the brakes, said pressure responsive portion of said motor mechanism being subject to pressure in said chamber to react against pressure in said primary control line to urge said vacuum valve to open position and said air valve to closed position, a device engaging said pressure responsive portion and providing a net biasing force normally tending to open said vacuum valve and close said air valve, and pressure responsive means for rendering said device ineffective when a predetermined increase in pressure occurs in said chamber.

2. In a remote control vacuum operated brake system having a control line to transmit pressure impulses from a source of pressure to control remote brakes, and remote means normally subject to vacuum and responsive to said pressure impulses in said control line to control a vacuum source to cause the application of said brakes, in combination, an amplifying relay valve interposed in said control line and dividing said control line into a primary control line normally subject to a vacuum and adapted to receive pressure impulses from said source and a secondary control line normally subject to a vacuum and connected to said remote means, said amplifying relay valve comprising a first chamber communicating with said primary control line and a second chamber communicating with said secondary control line, a normally open vacuum valve and a normally closed air valve respectively controlling communication between said second chamber and a source of vacuum and the atmosphere, a diaphragm separating said chambers and operatively connected to said air valve and said vacuum valve to close the latter and open the former in response to control pressure impulses in said first chamber to admit air to said second chamber and to said secondary control line, the pressure in said secondary control line reacting on said diaphragm to urge said vacuum and air valves toward normal positions, biasing means having mechanical connection with said valves and providing a net biasing force acting against said valves to tend to maintain them in said normal positions, and pressure responsive means engaged by said biasing means and cooperating with said diaphragm for rendering said biasing means inoperative when control pressure in said second chamber increases to a predetermined point whereby further increases in pressure in said second chamber, acting on said diaphragm, will urge said vacuum and air valves toward their normal positions.

3. A system according to claim 2 wherein said pressure responsive means for rendering said biasing means inoperative comprises a normally vacuum suspended second diaphragm subject to pressure in said second chamber and connected to be moved when such pressure increases to a predetermined point, and means engageable with said second diaphragm to limit such movement thereof to render said biasing means inoperative.

4. A fluid pressure control system comprising a vacuum reservoir, a vacuum operated motor, a conversion valve connected between said reservoir and said motor and normally disconnecting the latter from said reservoir, a secondary control line normally subject to a vacuum and connected to said conversion valve and subject to increases in pressure to operate said conversion valve and connect said reservoir to said motor, and an amplifying relay valve device having a control chamber connected to said secondary control line, air and vacuum valves in said control chamber having normal positions connecting such chamber to a source of vacuum and disconnecting such chamber from the atmosphere, means biasing said air and vacuum valves to said normal positions, a primary control line normally subject to a vacuum and adapted to receive control pressure impulses, said relay valve device having a second chamber connected to said primary control line, first fluid pressure responsive means movable by control pressure in said second chamber and including means for closing said vacuum valve and opening said air valve, said first fluid pressure responsive means being subject to pressure in said control chamber, and second pressure responsive means operable upon a predetermined increase in pressure in said control chamber, and resilient means engaging and opposing operation of said second pressure responsive means for rendering such pressure effective for opposing movement of said first fluid pressure responsive means.

5. A fluid pressure control system comprising a vacuum reservoir, a vacuum operated motor, a conversion valve connected between said reservoir and said motor and normally disconnecting the latter from said reservoir, a secondary control line normally subject to a vacuum and connected to said conversion valve and subject to increases in pressure to operate said conversion valve and connect said reservoir to said motor, and an amplifying relay valve device having a control chamber connected to said secondary control line, air and vacuum valves in said control chamber having normal positions connecting such chamber to a source of vacuum and disconnecting such chamber from the atmosphere, means biasing said air and vacuum valves to said normal positions, a primary control line normally subject to a vacuum and adapted to receive pressure impulses, said relay valve device having a second chamber connected to said primary control line, first fluid pressure responsive means movable by an increase in control pressure in said second chamber for closing said vacuum valve and opening said air valve, said first fluid pressure responsive means being subject to pressure in said control chamber, second fluid pressure responsive means operatively connected to said first pressure responsive means and operable upon a predetermined increase in control pressure in said control chamber for rendering such pressure effective for opposing movement of said first fluid pressure responsive means, a second vacuum suspended motor, manually operable means for directing pressure to said second vacuum motor, said primary control line being operatively connected to said second vacuum motor whereby pressure admitted to the latter raises pressure in said primary control line.

6. In a remote control vacuum brake system having a control line normally subject to a vacuum and operative to transmit pressure impulses from a source of pressure to control remote brakes, and remote means normally subject to vacuum and responsive to said pressure impulses in said control line to control a vacuum source to cause the application of said brakes, in combination, an amplifying relay valve interposed in said control line and dividing said control line into a primary control line adapted to receive pressure impulses from said source of pressure and a secondary control line connected to said remote means, said amplifying relay valve comprising a first chamber communicating with said primary control line and a second chamber communicating with said secondary control line, a normally open vacuum valve and a normally closed air valve respectively controlling communication between said second chamber and a source of vacuum and the atmosphere, a diaphragm separating said chambers and operatively connected to said air valve and said vacuum valve to close the latter and open the former in response to pressure impulses from said primary control line in said first chamber to directly admit air to said second chamber and to said secondary control line, means having mechanical connection with said diaphragm and normally acting to prevent pressure in said second chamber from reacting on said diaphragm, and means having mechanical connection with said last-named means and responsive to pressure in said second chamber for rendering said last-named means inoperative when pressure in said second chamber increases to a predetermined point, whereby, beyond such point, pressure in said second chamber tends to move said diaphragm to open said vacuum valve and close said air valve.

7. A fluid pressure control system comprising a vacuum reservoir, a vacuum operated motor, a conversion valve connected between said reservoir and said motor and normally disconnecting the latter from said reservoir, a secondary control line normally subject to a vacuum and connected to said conversion valve and subject to increases in pressure to operate said conversion valve and connect said reservoir to said motor, and an amplifying relay valve device comprising a body having a chamber therein communicating with said secondary control line, a vacuum passage connected to a vacuum source and having a valve seat in said chamber, an air passage open to the atmosphere and having a valve seat opening into said chamber, a vacuum valve for said first-named seat and an air valve for said second-named seat, means biasing said vacuum valve to a normal open position and said air valve to a normally closed position, first fluid pressure responsive means comprising a pressure responsive element and a variable pressure primary control line to the pressure in which said element is subjected, said element being operatively connected to said valves and movable upon pressure increases in said primary line for overcoming said biasing means to transmit a force to said valves to close said vacuum valve and open said air valve, second fluid pressure responsive means operatively connected to said element and subject to an increase in pressure in said chamber for tending to render such pressure effective for opposing movement of said element, and means having mechanical connection with said second fluid pressure responsive means for opposing movement of said element only after pressure in said chamber has increased above a predetermined point.

8. A system according to claim 7 wherein said first fluid pressure responsive means comprises a second chamber communicating with said primary control line, said element being a diaphragm separating said chambers from each other.

9. A fluid pressure control system comprising a vacuum reservoir, a vacuum operated motor, a conversion valve connected between said reservoir and said motor and normally disconnecting the latter from said reservoir, a secondary control line connected to said conversion valve and subject to increases in pressure to operate said conversion valve and connect said reservoir to said motor, and an amplifying relay valve device having a control chamber connected to said secondary control line, air and vacuum valves in said control chamber having normal positions connecting such chamber to a source of vacuum an disconnecting such chamber from the atmosphere, means biasing said air and vacuum valves to said normal positions, a primary control line normally subject to vacuum and adapted to receive pressure impulses, said relay valve device having a second chamber connected to said primary control line, a diaphragm separating said chambers, a vacuum chamber in axial alinement with said control chamber, springs in said second chamber and said vacuum chamber urging said diaphragms toward each other, and axially separable means connected between said diaphragms, the spring in said vacuum chamber being stronger than the spring in said second chamber whereby said diaphragms move as a unit until the pressure in said control chamber reaches a predetermined point at which such pressure acting on said second diaphragm opens said axially separable means and compresses and renders ineffective the spring in said vacuum chamber.

10. In a tractor-trailer brake system wherein a tractor is provided with a source of vacuum and a pedal-controlled vacuum suspended brake booster motor energizable by disconnecting one end of said motor from said source and connecting it to the atmosphere, and wherein the trailer is provided with a vacuum reservoir connected to said source, vacuum operated brake applying motors and a conversion valve connected between said reservoir and said brake applying motors, a secondary control line normally subject to vacuum and connected to said conversion valve to operate the latter, and a primary control line normally subject to vacuum and connected to said booster motor; an amplifying relay valve having a first chamber communicating with said secondary control line and normally communicating with said source, a second chamber communicating with said primary control line, a diaphragm sealing said chambers from each other and subject to pressures therein, valve mechanism connected to be operated by said diaphragm upon an increase in pressure in said second chamber for closing communication between said first chamber and said source and opening such chamber to the atmosphere, a vacuum chamber, a second diaphragm between said first chamber and said vacuum chamber, springs in said second chamber and said vacuum chamber biasing said diaphragms for movement toward each other, and means limiting movement of said diaphragms toward each other and comprising elements freely axially separable, the spring in said vacuum chamber being stronger than the spring in said second chamber whereby said diaphragms move as a unit upon an increase in pressure in said second chamber until pressure in said first chamber increases to a predetermined point, whereupon the spring in said vacuum chamber is compressed and the pressure in said first chamber opposes movement of said first-named diaphragm.

11. An amplifying relay valve device comprising a first chamber having a vacuum duct extending thereinto and terminating in a vacuum valve seat, an air duct extending into said first chamber and terminating in an air valve seat, a second chamber having a port for communication with a variable pressure fluid line, a diaphragm sealing said chambers from each other, a vacuum chamber having communication with said vacuum duct, a second diaphragm sealing said vacuum chamber from said first chamber, a normally open vacuum valve for said vacuum valve seat, a normally closed air valve for said air valve seat, means mechanically connecting said first diaphragm to said valves whereby an increase in pressure in said second chamber closes said vacuum valve and opens said air valve, said means mechanically connecting said valves comprising a stem connected to said first diaphragm and having abutting engagement with said second diaphragm, and springs in said second chamber and in said vacuum chamber acting respectively against said first and second diaphragms to move them toward each other, the spring in said vacuum chamber being stronger than the other spring.

12. An amplifying relay device comprising a first chamber having a vacuum duct extending thereinto and terminating in a vacuum valve seat, an air duct extending into said chamber and terminating in an air valve seat, a second chamber having a port for communication with a variable pressure fluid line, a first diaphragm sealing said chambers from each other, a vacuum chamber, a second diaphragm sealing said vacuum chamber from said first chamber, a coil spring connecting said diaphragms, successive convolutions of the coils of said spring contacting with each other under tension, a vacuum valve for said vacuum valve seat, an air valve for said air valve seat, and spring means biasing said vacuum valve to a normal open position and said air valve to a normally closed position, said valves being connected to be operated by said first diaphragm to be moved thereby upon an increase in pressure in said second chamber to close said vacuum valve and open said air valve.

13. In a remote control vacuum operated brake system having a control line to transmit pressure impulses from a source of pressure to control remote brakes, and a remote means normally subject to vacuum and responsive to said pressure impulses in said control line to control a vacuum source to cause the application of said brakes, in combination, an amplifying relay valve interposed in said control line and dividing said control line into a primary control line normally subject to vacuum and adapted to receive pressure impulses from said source, and a secondary control line normally subject to vacuum and connected to said remote means, said amplifying relay valve comprising valve means normally opening said secondary control line to a source of vacuum and operable to disconnect said secondary control line from said source of vacuum and directly connect it to the atmosphere, an expansible chamber motor mechanism including a normally vacuum suspended pressure responsive portion responsive to a pressure impulse in said primary control line to operate said valve means to disconnect said secondary control line from said source of vacuum and connect it directly to the atmosphere for operating said remote means for causing actuation of the brakes, actuating pressure caused by admission of air into said secondary control line reacting on said pressure responsive portion of said expansible chamber motor mechanism to tend to urge said valve means to reduce the admission of air into said secondary control line, and means cooperating with said pressure responsive portion to prevent reaction of said actuating pressure in said secondary control line against said pressure responsive portion until the admission of air into said secondary control line raises the pressure therein to a predetermined point.

14. In a tractor-trailer brake system wherein a tractor is provided with a source of vacuum and a pedal-controlled vacuum suspended brake booster motor energizable by disconnecting one end of said motor from said source and connecting it to the atmosphere, and wherein the trailer is provided with a vacuum reservoir connected to said source, vacuum operated brake applying motors and a conversion valve connected between said reservoir and said brake applying motors, a secondary control line normally subject to a vacuum and connected to said conversion valve to operate the latter, and a primary control line normally subject to a vacuum and connected to said booster motor; an amplifying relay valve having a first chamber having a vacuum duct extending thereinto and terminating in a vacuum valve seat, an air duct extending into said chamber and terminating in an air valve seat, a second chamber having a port in communication with said primary control line, a first diaphragm sealing said chambers from each other, a vacuum chamber, a second diaphragm sealing said vacuum chamber from said first chamber, a coil spring connecting said diaphragms, successive convolutions of the coils of said spring contacting each other under tension, a vacuum valve for said vacuum valve seat, an air valve for said air valve seat, said secondary line communicating with said first chamber, said spring means biasing said vacuum valve to a normally open position and said air valve to a normally closed position, said valves being connected to be operated by said first diaphragm to be moved thereby upon an increase in pressure in said second chamber to close said vacuum valve and open said air valve.

References Cited in the file of this patent
UNITED STATES PATENTS

| | | |
|---|---|---|
| 1,973,326 | Besler | Sept. 11, 1934 |
| 2,230,048 | Elliott | Jan. 28, 1941 |
| 2,304,621 | Baade | Dec. 8, 1942 |
| 2,352,001 | Oliver | June 20, 1944 |
| 2,429,194 | Price | Oct. 14, 1947 |
| 2,429,196 | Price | Oct. 14, 1947 |
| 2,463,172 | Gunderson | Mar. 1, 1949 |
| 2,857,988 | Stelzer | Oct. 28, 1958 |